3,371,994
PRODUCTION OF PHOSPHINE
Edward James Lowe and Frederick Arthur Ridgway, Stourbridge, England, assignors to Hooker Chemical Corporation, Niagara Falls, N.Y., a corporation of New York
No Drawing. Filed Apr. 1, 1963, Ser. No. 269,727
Claims priority, application Great Britain, Apr. 4, 1962, 12,942/62
6 Claims. (Cl. 23—204)

The invention concerns the reaction between phosphorus and water.

Hitherto, the reaction between phosphorus and water has been carried out with the object of producing phosphoric acid and hydrogen, reaction taking place at a temperature above 250° C. and under pressure, usually in the presence of a catalyst. Both red and white phosphorus are known to react in this way. It is also known that phosphine is produced as a by-product in this reaction, according to the equation:

$$8P + 12H_2O \rightarrow 3H_3PO_4 + 5PH_3$$

We have now found that the reaction between phosphorus and water can be used as a convenient method for the production of phosphine in good yield. Phosphine is obtained to the extent of 94–99% in the gases evolved from the reaction. This represents a percentage approaching 62.5 of the initial phosphorus being converted into phosphine, which is the maximum amount which can theoretically be converted into phosphine according to the above equation. The remaining phosphorus, viz. approximately 37.5%, is converted into orthophosphoric acid. The formation of the latter is not deleterious, as phosphoric acids are used in the process, according to the invention, for lowering the vapour pressure of the water, as will be described below.

Both commercial red phosphorus and white phosphorus may be used. The use of white phosphorus, however, has an advantage in that it can be converted in situ, during heating of the reactants, into a finely divided red phosphorus which reacts faster than ordinary red phosphorus. Furthermore, we have found that by varying the conditions of the reaction, as described below, the red phosphorus thus produced may be isolated and recovered, and the reaction can therefore be used as a method for the production of red phosphorus.

Accordingly, the invention provides a method for the manufacture of phosphine, with or without red phosphorus as a by-product, wherein phosphorus is mixed with liquid water at a temperature above 250° C., the vapour pressure of the water being lowered by the presence of phosphorus pentoxide in an amount sufficient to produce a strong solution of orthophosphoric acid and/or of condensed phosphoric acids, and phosphine is evolved, which is collected and, if desired, the red phosphorus produced is recovered.

The form in which the red phosphorus produced by conversion of white phosphorus is deposited is important both for the yield of phosphine and the value of the red phosphorus which may be recovered. To obtain best yields of phosphine, the red phosphorus must have a large surface area and we have established the conditions necessary for this. The white phosphorus is heated in the aqueous phosphoric acid medium until about 50% has been converted to red phosphorus. Up to this point it is not necessary to agitate the mixture. After 50% conversion, the white phosphorus should be distilled away as rapidly as possible. This gives rise to a honeycomb mass of red phosphorus of large surface area. If, on the other hand, conversion is continued after the 50% point, without distilling off white phosphorus, the red phosphorus tends to agglomerate in hard lumps of low surface area although this tendency can be mitigated by strong agitation of the mixture. When the white phosphorus content is reduced to below about 4% of the total phosphorus content, there is transiently obtained a very high rate of phosphine evolution and the red phosphorus is rapidly converted to an extremely finely divided form. As the white phosphorus content is further depleted below about 0.1% of the total phosphorus content, the finely divided red phosphorus is no longer wetted by either white phosphorus or the aqueous medium upon which it floats and with which it reacts only slowly. For maximum yield of red phosphorus it is necessary to remove white phosphorus quickly so as to minimise the time during which the white phsphorus content is in the range 0.1 to 4% of the total phosphorus content.

The production of phosphine starts at a temperature of about 170° C. and proceeds slowly up to a temperature of about 280° C., at which temperature the white phosphorus is converted to red phosphorus at an economic rate. The reaction rate and phosphine content of the gases evolved increase with the proportion of red phosphorus in the mixture. This increase is gradual until the proportion of red phosphorus in the mixture reaches about 90%, at which stage finely divided red phosphorus starts to separate from the bulk of the phosphorus, and there is a marked increase in the reaction rate and phosphine content of the gases evolved, which is maintained until substantially all the phosphorus has been converted to red phosphorus and has reacted. When a steady phosphine evolution rate is established, more white phosphorus may be added either batchwise or continuously, the quantity added matching the quantity consumed in the reaction. Similarly water can be added and phosphoric acids removed, so that a continuous process is achieved. It will be understood that the precautions described above for producing red phosphorus of large surface area should be adopted; otherwise the red phosphorus assumes the hard massive nature of the usual red phosphorus of commerce, which reacts only slowly to yield phosphine. In that case, dependent upon the degree of agitation, hard red phosphorus is periodically removed from the system, better agitation requiring less frequent red phosphorus removal.

As the reaction proceeds substantial amounts of water are used up, as can be seen from the equation given above, and it is advantageous to replenish the amount of water present by adding it in the form of steam. This allows an energy balance to be maintained by varying the degree of superheat of the steam. Furthermore, such steam addition provides a convenient means of agitating the reactants. Alternatively, a mechanical stirrer can be provided.

The conversion of white phosphorus to red phosphorus can, if desired, be brought about wholly or partially outside the reaction vessel and in the absence of an aqueous phase, using techniques known to the art. To the extent that this is done, white phosphorus need not be removed from the reaction vessel.

In a preferred method of carrying out the reaction to obtain maximum overall economy in the production of phosphine, use is made of the high rate of phosphine evolution obtained during the distillation of white phosphorus from a partially converted white phosphorus-red phosphorus mixture in contact with aqueous phosphoric acid. A batch of white phosphorus is placed in the reactor with some phosphoric acid and the mixture is heated with addition of steam to a temperature just below the boiling point of white phosphorus, i.e., a temperature just below 280° C. The temperature is maintained in the range 275° C.–285° C. Heating is continued for about 6½ hours until approximately 50% of the white phosphorus has been converted to red phosphorus. White phosphorus is then distilled off until the amount remaining is not more than 4% of the total amount of phosphorus present. As mentioned above, a high rate of evolution of phosphine then occurs, and this is maintained if white phosphorus is added continuously so as to maintain the proportion of white phosphorus, in the reaction, between 0.1 and 4% of the total amount of phosphorus present. Steam addition is also maintained until substantially all of the red phosphorus has reacted and phosphine has been evolved at high rate.

The invention is illustrated in the following examples:

Example 1

600 grams of white phosphorus were placed above a 2 inch deep layer of phosphoric acid of boiling point 280° C. in a graphite reactor of a diameter of 4 inches and 8 inches tall. The reactants were gently refluxed at a temperature of 275–285° C., the reflux temperature being maintained by the addition of water as necessary. No stirring was used except that which resulted from the action of the boiling reactants. The gas evolution rate steadily increased to 50 cubic centimeters (hereafter indicated as cc.) per minute during 30 hours, then increased quickly to about 100 cc. per minute, which rate was maintained for 20 hours. The rate then dropped gradually to give complete reaction after a further 40 hours. The average phosphine content of the evolved gases was 95 volume percent.

Example 2

Using a reactor, as described in Example 1, and fitted with a carbon stirrer rotating at 180 r.p.m., 400 grams of white phosphorus were placed above a 2 inch deep layer of phosphoric acid and refluxed gently at 275–285° C., with water addition as necessary. The gas evolution rate steadily increased to 60 cc. per minute in 16 hours, then increased quickly to about 100 cc. per minute, which rate was maintained for 22 hours. The rate then decreased steadily to give complete reaction after a further 13 hours. The average phosphine content of the evolved gases was about 95 volume percent.

Example 3

A 2 inch layer of phosphoric acid was heated under reflux in a reactor as described in Example 1. An average amount of 7.8 grams of white phosphorus was added to the gently refluxing acid at hourly intervals, the amount of phosphorus added matching the rate at which the phosphorus reacts. Water was added as required to keep the reflux temperature within the range 275–285° C. No stirring was used other than that resulting from the boiling action. Significant gas evolution started after 27 hours and the gas evolution rate steadily increased to about 50 cc. per minute during a further 24 hours. The reaction ran continuously for a period of 12 days during which time the gas evolution rate averaged about 50 cc. per minute and the average phosphine content of the evolved gas was 94 volume percent. On the final day, removal of some acid resulted in a drastic reduction of gas evolution rate which was subsequently found to be due to the residual phosphorus having formed a hard deposit which remained suspended above the lowered acid level and which was not then available for reaction with the acid. The weight of unreacted phosphorus in the reaction vessel at the end of the experiment was 550 grams. Periodic checks on the phosphorus balance indicated that about this quantity of phosphorus represented the equilibrium quantity for the particular reaction conditions.

Example 4

A 2 inch boiling layer of phosphoric acid was refluxed at a temperature of 275–285° C. in a reactor as described in Example 1 and fitted with a carbon stirrer rotating at 180 r.p.m. An average amount of 10.0 grams of white phosphorus was added to the gently refluxing acid at hourly intervals and the temperature of 275–285° C. was maintained by the addition of water. Significant gas evolution started after 10 hours and reached about 70 cc. per minute, containing 94 volume percent phosphine, after a further 21 hours, which average rate was maintained for four days.

Example 5

100 grams of white phosphorus were heated under reflux in a 500 cc. silica flask with 300 grams of phosphoric acid boiling at atmospheric pressure at 280° C. The boiling point of the acid was maintained by addition of water to replace that consumed in the reaction. During the course of 40 hours heating the rate of evolution of gaseous reaction product increased steadily as did the proportion of phosphine in the gas. After the 40 hours heating at 280° C. more than 90 percent of the original white phosphorus had either reacted or had been converted to very finely divided amorphous phosphorus which reacted faster than the original white phosphorus. The temperature was now varied by varying the addition of water to the system and the following reaction rates were determined:

23.5 cc./minute at 250° C.
66.5 cc./minute at 265° C.
100 cc./minute at 280° C.
210 cc./minute at 300° C.
255 cc./minute at 335° C.

At temperatures up to 300° C. the gas contained 97 to 99 volume percent phosphine. At 330° C. the gas contained 90 volume percent phosphine.

Example 6

150 grams of white phosphorus and 300 grams of phosphoric acid, boiling at 280° C., were placed in a 500 cc. silica flask, and steam at 270° C. was passed into the aqueous phase at at rate of 1.8 grams per minute. The condenser arrangement was such that phosphorus was returned to the flask but water condensate was removed. The reflux temperature was maintained at 275–285° C. by varying the small external heating of the flask. The phosphorus layer was nicely agitated for the first six hours but then started to go solid and eventually formed a loose ring round the central steam path. The gas evolution rate after 30 hours was about 95 cc. per minute, the phosphine content of the gas evolved being 94.5 volume percent.

Example 7

150 grams of white phosphorus and 300 grams of phosphoric acid, boiling at 280° C., were placed in a 500.cc. silica flask, and steam at 270° C. was passed into the aqueous phase at a rate of 1.8 grams per minute. The condenser arrangement was such that no water condensate was returned to the flask but condensed phosphorus was returned for 20 hours. After this time gas, with a phosphine content of 93 volume percent, was evolved at a rate of 60 cc. per minute. Condensed phosphorus was then steadily removed from the system and, after 20 minutes, the residual red phosphorus rapidly broke up into fine particles. The gas evolution rate increased to 200 cc. per minute when at most 5 grams of white phosphorus remained in the flask. The phosphine content of the gas evolved was 96.5 volume percent. The residual 5 grams of white phosphorus were then distilled off and, as this was done, the red phosphorus became very finely divided and non-wetted and the gas evolution rate fell to 20 cc. per minute, the phosphine content being 96 volume percent. Some of the finely divided phosphorus was carried up into the condenser and the reaction was terminated. The reactants were cooled and filtered, and finely divided red phosphorus was washed from the solid product as a suspension in water which was filtered to yield 88 grams of red phosphorus.

Example 8

400 grams of white phosphorus were heated for 5 hours at 280° C. while being stirred with a vibro-mixer. The product, which contained 40 percent red phosphorus, was placed in a 500 cc. silica flask with 200 grams phosphoric acid boiling at 280° C. Steam, at a temperature of 270° C., was passed into the aqueous phase at a rate of 1.8 grams per minute and the white phosphorus remaining in the flask was then distilled during a time of 2 hours so that the amount remaining was about 4% of the amount of red phosphorus present. Visual observation together with gas evolution indicated when the red phosphorus had attained its optimum condition and, at this point, the white phosphorus condensate was henceforth returned to the flask to maintain the presence of between 0.1% to 4% of white phosphorus based on the total amount of phosphorus present. There was no water return to the flask. The gas evolution rate steadily increased, during the time white phosphorus was being distilled off, to a rate of 200 cc. per minute containing 94 volume percent of phosphine at the optimum red phosphorus condition. This rate was maintained for 4 hours, after which only 31 grams of phosphorus remained in the flask.

What we claim is:

1. A method for manufacturing phosphine which comprises mixing phosphorus with a strong aqueous solution of an acid selected from the group consisting of orthophosphoric acid and condensed phosphoric acids at a temperature above 250° C., and collecting the evolved phosphine, wherein when white phosphorus is used as starting material conversion thereof to red phosphorus is allowed to proceed until a quantity of white phosphorus, between 0.1 and 4% by weight of the total phosphorus, remains, whereupon this quantity is maintained by continuous addition of further white phosphorus, water also being added as required, the reactants being agitated at least after the point of 50% conversion has been reached.

2. A method in accordance with claim 1, wherein a mixture of white phosphorus and red phosphorus is used as starting material, wherein steam is passed into the aqueous phosphoric acid medium, and wherein, in addition to phosphine, red phosphorus is recovered, said red phosphorus being characterized by high degree of reactivity, and by a large surface area.

3. A method for manufacturing phosphine which comprises mixing phosphorus with a strong aqueous solution of an acid selected from the group consisting of orthophosphoric acid and condensed phosphoric acids at a temperature above 250° C., and collecting the evolved phosphine wherein when white phosphorus is used as starting material conversion thereof to red phosphorus is allowed to proceed until about 50% of the white phosphorus has been converted to red phosphorus, and the residual white phosphorus is then distilled off until the amount remaining is between 0.1 and 4% of the total amount of phosphorus present.

4. A method in accordance with claim 3, wherein a mixture of white phosphorus and red phosphorus is used as starting material, wherein steam is passed into the aqueous phosphoric acid medium, and wherein, in addition to phosphine, red phosphorus is recovered, said red phosphorus being characterized by high degree of reactivity, and by a large surface area.

5. A method for manufacturing phosphine which comprises mixing phosphorus with a strong aqueous solution of an acid selected from the group consisting of orthophosphoric acid and condensed phosphoric acids at a temperature above 250° C., and collecting the evolved phosphine, wherein when white phosphorus is used as starting material conversion thereof to red phosphorus is allowed to proceed until about 50% of the white phosphorus has been converted to red phosphorus, the residual white phosphorus is then distilled off until the amount of white phosphorus which remains is between 0.1 and 4% of the total amount of phosphorus present, the red phosphorus is allowed to react while, at the same time, white phosphorus is added to maintain the presence at all times of an amount of white phosphorus between 0.1 and 4% of the total amount of phosphorus present.

6. A method in accordance with claim 5, wherein, in addition to phosphine, red phosphorus is recovered, said red phosphorus being characterized by a high degree of reactivity, and by a large surface area.

References Cited

UNITED STATES PATENTS

| | | | |
|---|---|---|---|
| 2,397,951 | 4/1946 | De Witt | 23—223 |
| 3,116,109 | 12/1963 | Cummins | 23—107 |

OTHER REFERENCES

Mellor: Comprehensive Treatise on Inorganic & Theoretical Chemistry, volume 8, pp. 784, 806 (1928).

Van Wazer: Phosphorus and Its Compounds, volume I, p. 112 (1958).

Pascal: Nouveau Traite de Chimie Minerale, volume X, p. 732 (1956).

MILTON WEISSMAN, *Primary Examiner.*

MAURICE A. BRINDISI, *Examiner.*

R. DAVIDSON, *Assistant Examiner.*